(12) United States Patent
Glenn

(10) Patent No.: US 7,344,177 B1
(45) Date of Patent: Mar. 18, 2008

(54) COMBINED VEHICLE SUN VISOR EXTENDER AND CD HOLDER

(76) Inventor: Gregory Glenn, 225 W. 8th Ave., Escondido, CA (US) 92025

(*) Notice: Subject to any disclaimer, the term of this patent is extended or adjusted under 35 U.S.C. 154(b) by 0 days.

(21) Appl. No.: 11/595,460

(22) Filed: Nov. 9, 2006

Related U.S. Application Data

(60) Provisional application No. 60/781,201, filed on Mar. 13, 2006.

(51) Int. Cl.
  *B60J 1/04* (2006.01)
(52) U.S. Cl. ................................. 296/97.6; 224/312
(58) Field of Classification Search .............. 296/97.6; 224/312
  See application file for complete search history.

(56) References Cited

U.S. PATENT DOCUMENTS

| | | | | |
|---|---|---|---|---|
| 4,792,176 A | * | 12/1988 | Karford | ..................... 296/97.8 |
| 5,156,434 A | * | 10/1992 | Vandagriff | ................. 296/97.8 |
| 5,259,657 A | * | 11/1993 | Arendt et al. | .............. 296/97.6 |
| 5,653,364 A | * | 8/1997 | Eskandry | ..................... 224/312 |
| 6,176,539 B1 | | 1/2001 | Westerman | |
| 6,412,850 B1 | | 7/2002 | Francis et al. | |
| 6,659,529 B2 | | 12/2003 | Palmer et al. | |

* cited by examiner

*Primary Examiner*—Dennis H Pedder

(57) ABSTRACT

A sun visor extender and CD holder includes a frame and a pair of longitudinal sides. A plurality of notches is formed along a top surface of the sides. Oppositely disposed ends are formed with the sides and oriented orthogonal thereto. Open top and bottom faces define a central region between the sides and the ends. Straps traverse across a width of the frame and are anchored thereto and span subjacent to the top and bottom faces. A storage rack is attached to the frame and has shoulders bulging outwardly from a bottom surface thereof. The rack is oppositely faced from the straps and extends along an entire surface area of the top surface of the frame. A sun-blocking plate has a body interfitted between the sides and the ends and is supported by the straps.

18 Claims, 7 Drawing Sheets

COMBINED VEHICLE SUN VISOR EXTENDER AND CD HOLDER

CROSS REFERENCE TO RELATED APPLICATIONS

This application claims the benefit of U.S. Provisional Application No. 60/781,201, filed Mar. 13, 2006.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to sun visor extenders and, more particularly, to a combined vehicle sun visor extender and CD holder for use with an existing vehicle visor.

2. Prior Art

Sun visors are arranged across a windshield to provide shielding to occupants of a vehicle from the glare of the sun. However, often such visors do not cover enough area to provide sufficient protection. Thus, it is desirable to retrofit visors with extensions, both vertical and opposing lateral directions, to augment the protection provided with the original equipment sun visors. Various types of sun visor extensions have been described in the patent literature.

One prior art example shows a sun visor extension is adapted for use in connection with an existing sun visor of a vehicle. The sun visor extension comprises a body having a generally rectangular shape and two wings foldably connected to and extending along opposing long sides of the body. The width of the wings is less than that of the body. In addition, the wings are adapted to be folded towards each other to a juxtaposed position abutting the body thereby creating an open ended cavity having the length and width of body. An extension is slidably received within the cavity. The extension is a rectangular shape whose length corresponds to that of the body and whose width is narrower than that of the body. The extension is frictionally retained within the cavity by the wings and the body. The sun visor extension is removably attached to a sun visor. Unfortunately, this prior art example does not provide for storage of items such as CD's and the like.

Another prior art example shows a storage visor including a body portion and a plurality of overlapping flaps coupled to the body portion and forming a plurality of storage slots located between adjacent ones of the flaps. The storage visor further includes an expandable pocket coupled to the body portion, the pocket including at least one surface made of an elastic material. Unfortunately, this prior art example does not provide an extension for blocking sunlight in addition to the sunlight blocked by the body of the visor.

Accordingly, a need remains for a combined vehicle sun visor extender and CD holder in order to overcome the above-noted shortcomings. The present invention satisfies such a need by providing an apparatus that is simple and easy to use, is lightweight yet durable in design, and is designed for use with an existing vehicle visor. Such an apparatus provides those driving or riding in the front seats of automobiles with a comfortable means of viewing the road. The apparatus efficiently blocks sunlight entering from the vehicle side windows, and advantageously eliminates blinding glare caused there. The present invention conveniently ensures that a driver can safely and effectively see the road ahead, as well as oncoming traffic approaching from the side, even on very sunny afternoons. The present invention is inexpensive and easy to install.

BRIEF SUMMARY OF THE INVENTION

In view of the foregoing background, it is therefore an object of the present invention to provide an apparatus for a combined vehicle sun visor extender and CD holder. These and other objects, features, and advantages of the invention are provided by a combined vehicle sun visor extender and CD holder for use with an existing vehicle visor.

The apparatus includes a unitary frame that conveniently has a substantially rectangular shape. Such a frame has a centrally registered longitudinal axis and a pair of longitudinal sides equidistantly spaced from the axis and effectively extending parallel thereto. The frame further has oppositely disposed linear ends monolithically formed with the longitudinal sides and oriented orthogonal thereto respectively. Open top and bottom faces effectively define a hollow central region between the longitudinal sides and the linear ends respectively. Such longitudinal sides are conveniently provided with a pair of coextensively shaped flanges monolithically formed therewith. Such flanges advantageously lie above the sun-blocking plate (herein described below) and effectively extend inwardly towards a center of the open top surface. The flanges terminate equidistantly away from the longitudinal axis and are effectively spaced from the straps.

The apparatus further includes a plurality of elastic straps that have longitudinal lengths registered orthogonally to the longitudinal sides and effectively traverse across a width of the frame. Such straps are permanently anchored to the frame and advantageously span subjacent to the open top and bottom faces respectively. Each of such straps is conveniently provided with opposed ends directly coupled to corresponding ones of the longitudinal sides. The straps are effectively abutted directly against a first side of the existing visor while the sun-blocking plate travels along a contiguously extending second side of the existing visor.

The apparatus further includes an auxiliary storage rack removably attached to the frame. Such a storage rack conveniently includes solid top and bottom surfaces and has a longitudinal length substantially equal to the longitudinal length of the frame. The storage rack includes a plurality of slots conveniently formed along a top surface thereof such that a plurality of compact discs are removably positional therein respectively. The storage rack has a plurality of shoulders bulging outwardly from a bottom surface thereof, and the frame includes a plurality of notches effectively formed along a top surface of the longitudinal sides. Such shoulders are removably snapped into the notches in such a manner that the storage rack remains statically affixed to the frame during operating conditions while the sun-blocking visor extender is linearly extended back and forth along the longitudinal length of the frame. The storage rack is oppositely faced from the straps and effectively extends along an entire surface area of the open top surface of the frame.

The apparatus further includes a sun-blocking plate that has a unitary body telescopically interfitted between the longitudinal sides and the linear ends such that the sun-blocking plate is slidably displaced along a planar path defined along the frame. Such a sun-blocking plate is effectively supported by the straps in such a manner that the sun-blocking plate is advantageously prohibited from offsetting away from the planar path during operating conditions. The frame is removably attached directly to the existing visor and lays contiguously therewith. The straps are effectively tensioned about the existing visor and thereby maintain a static spatial relationship between the frame and the existing visor such that the sun-blocking plate is freely extendable without displacing the frame from a fixed position.

The sun-blocking plate includes a stop member monolithically formed with a top surface thereof. Such a stop member advantageously protrudes upwardly through the open top surface of the frame and is centrally registered between the flanges. The stop member travels linearly along the longitudinal axis and abuts against a proximal end of the frame such that the sun-blocking plate is effectively prohibited from detaching away from the frame. The sun-blocking plate further includes a lip portion monolithically formed with the top surface thereof. Such a lip portion is axially opposed from the stop member and extends linearly along the proximal end of the frame. The lip portion advantageously protrudes upwardly beyond the proximal end of the frame such that a user can effectively displace the sun-blocking plate while advantageously maintaining a continuous line of sight on a travel course.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
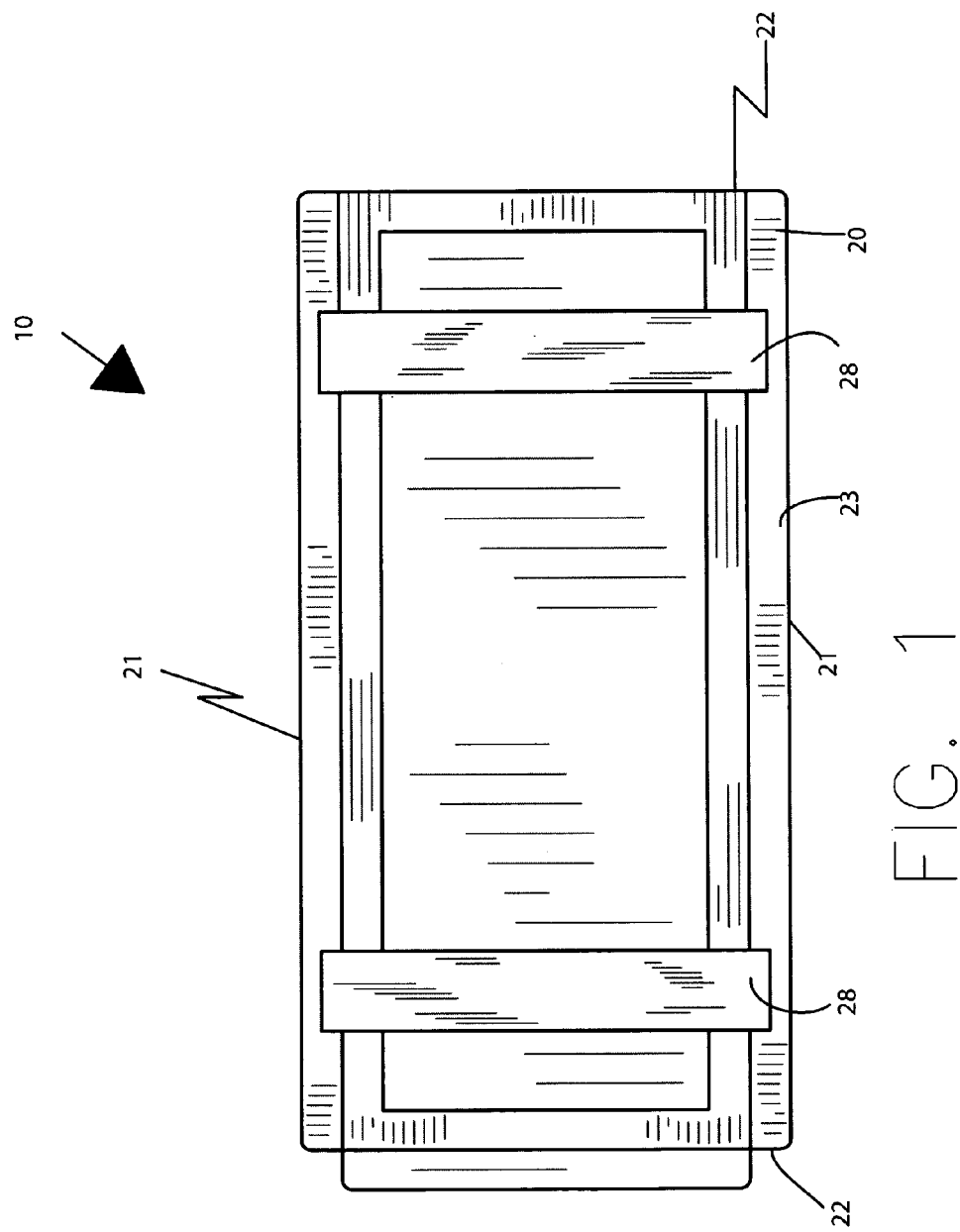
FIG. 1 is a rear elevational view of a combined sun visor extender and CD holder, in accordance with the present invention.
Figure 2:
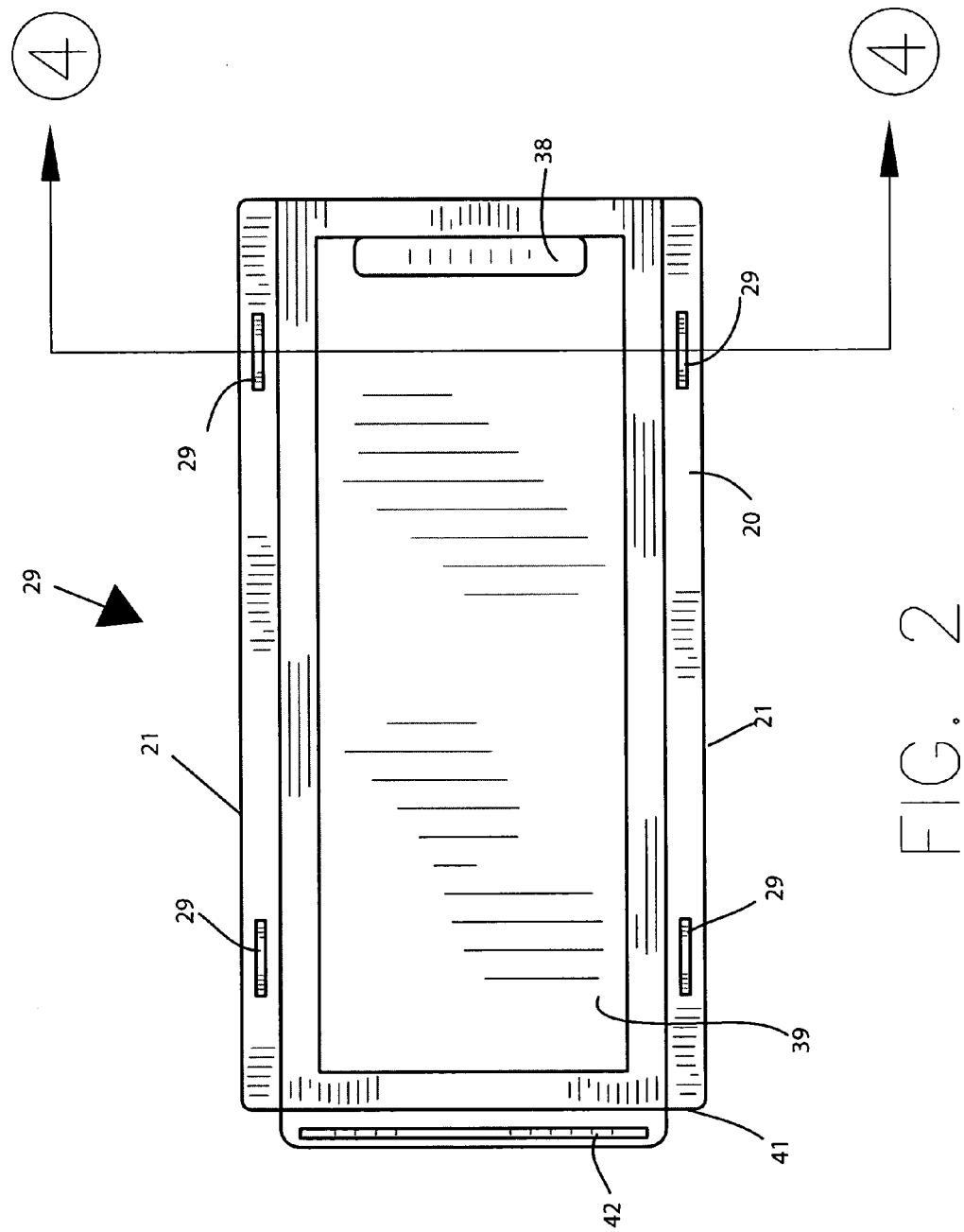
FIG. 2 is a front elevational view of apparatus shown in FIG. 1.
Figure 3:
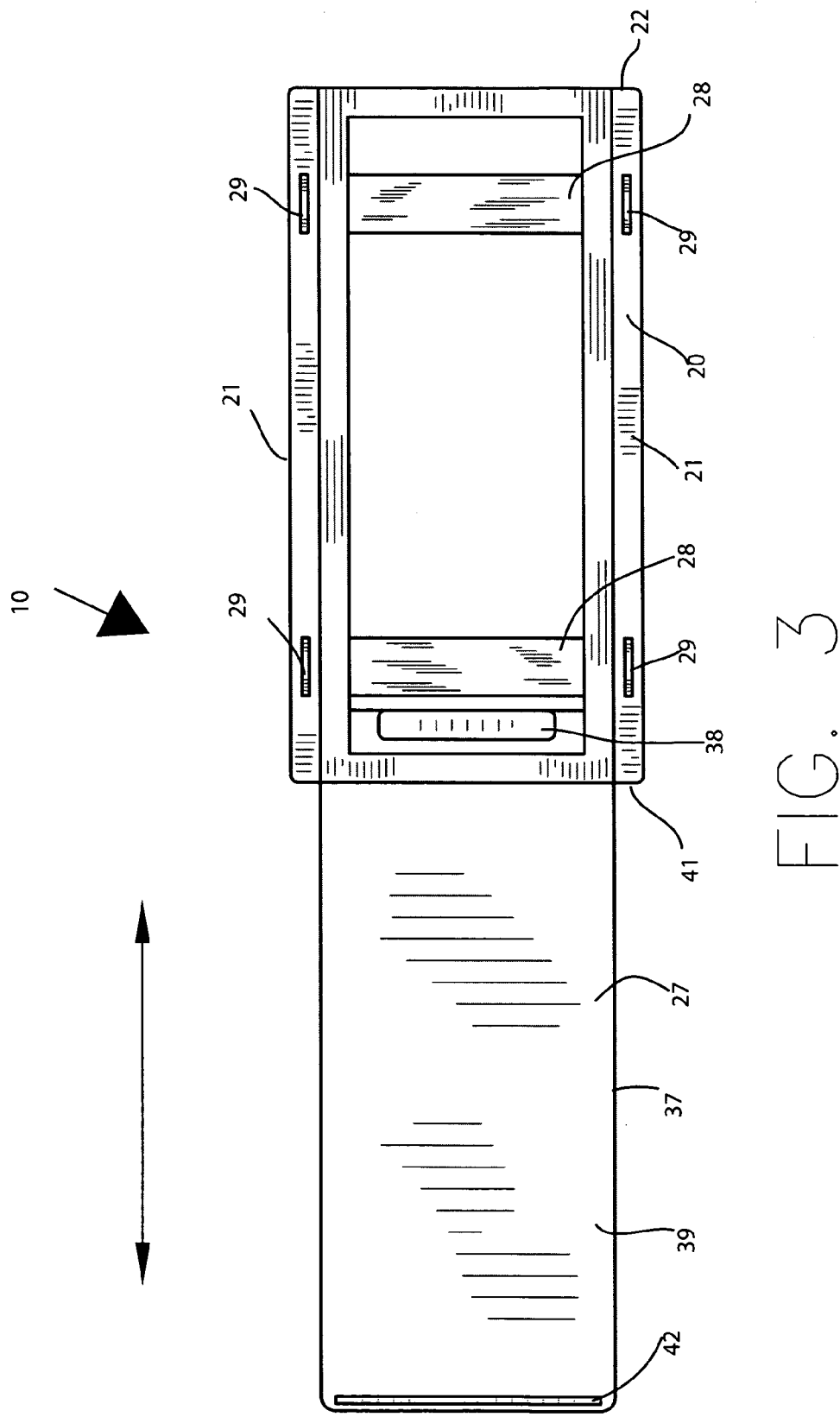
FIG. 3 is a rear elevational view of the apparatus shown in FIG. 1, showing the sun-blocking plate in the extended position.
Figure 4:
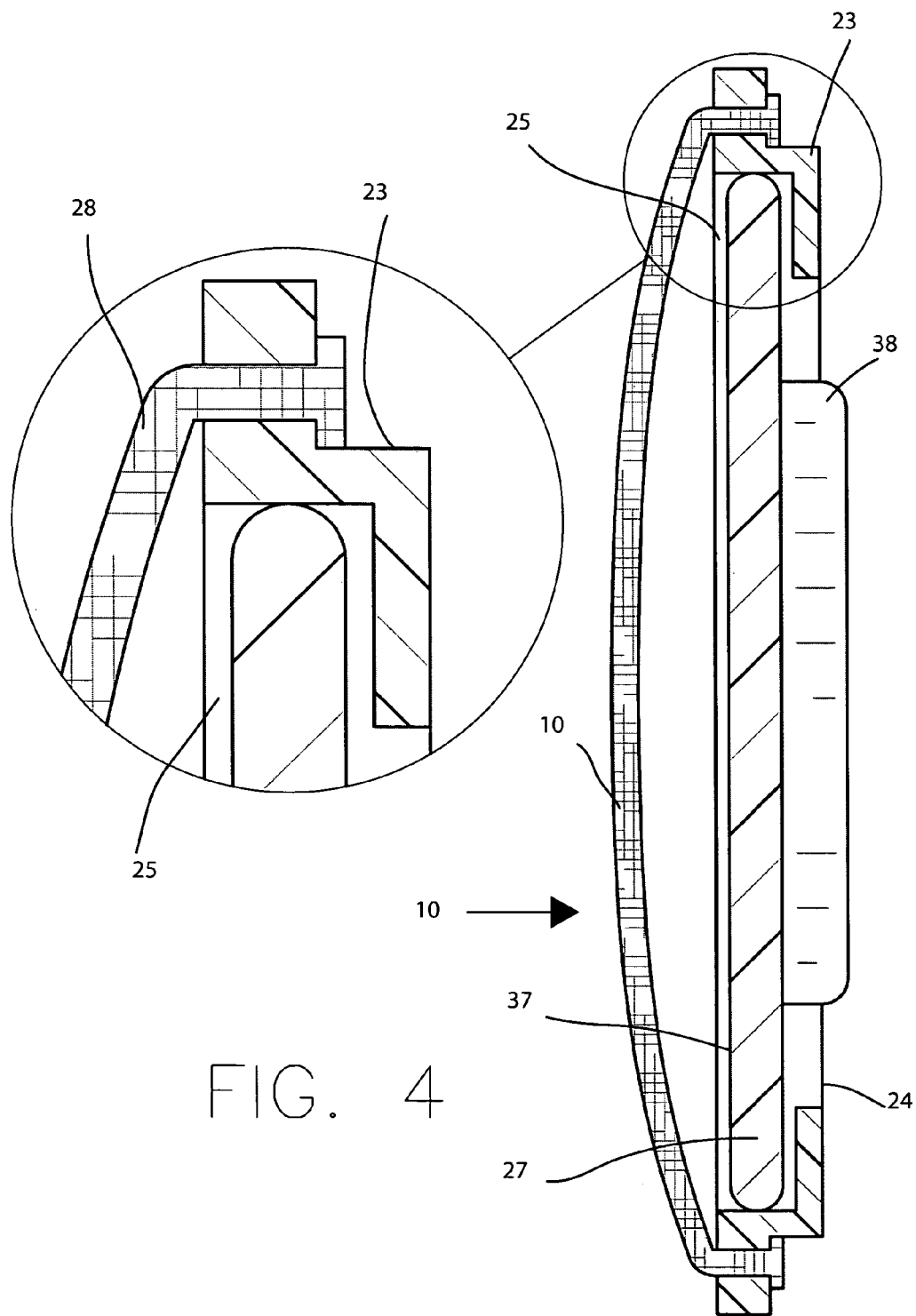
FIG. 4 is a cross sectional view of the apparatus shown in FIG. 2, taken along line 4-4.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-6 by the reference numeral 10 and is intended to provide a combined sun visor extender and CD holder. It should be understood that the apparatus 10 may be used to block sunlight in many different types of vehicles, and to hold many different types of objects, and should not be limited in use to blocking sunlight only in those vehicles described herein, and holding only those objects described herein.

Referring initially to FIGS. 1, 2, 3, 5 and 7, the apparatus 10 includes a unitary frame 20 that conveniently has a substantially rectangular shape. Of course, such a frame 20 can be produced in a variety of shapes and sizes, as is obvious to a person of ordinary skill in the art. Such a frame 20 has a centrally registered longitudinal axis and a pair of longitudinal sides 21 equidistantly spaced from the axis and effectively extending parallel thereto. The frame 20 further has oppositely disposed linear ends 22 monolithically formed with the longitudinal sides 21 and oriented orthogonal thereto respectively. Open top 23 and bottom 24 faces effectively define a hollow central region 25 between the longitudinal sides 21 and the linear ends 22 respectively. Such longitudinal sides 21 are conveniently provided with a pair of coextensively shaped flanges monolithically formed therewith. Such flanges advantageously lie above the sun-blocking plate 27 (herein described below) and critically extend inwardly towards a center of the open top face 23. The flanges terminate equidistantly away from the longitudinal axis and are necessarily spaced from the straps 28 (herein described below).

Referring to FIGS. 1, 2, 3, 4, 5, 6 and 7, the apparatus 10 further includes a plurality of elastic straps 28 that have longitudinal lengths registered orthogonally to the longitudinal sides 21 and effectively traverse across a width of the frame 20. Such straps 28 are permanently anchored to the frame 20 and critically span subjacent to the open top and bottom faces 23, 24 respectively. Each of such straps 28 is essentially provided with opposed ends 29 directly coupled to corresponding ones of the longitudinal sides 21, without the use of intervening elements. The straps 28 are effectively abutted directly against a first side 11 of the existing visor 12, without the use of intervening elements, while the sun-blocking plate 27 travels along a contiguously extending second side of the existing visor 12. Of course, such straps 28 can be formed from a variety of suitably flexible materials, as is obvious to a person of ordinary skill in the art.

Figure 5:
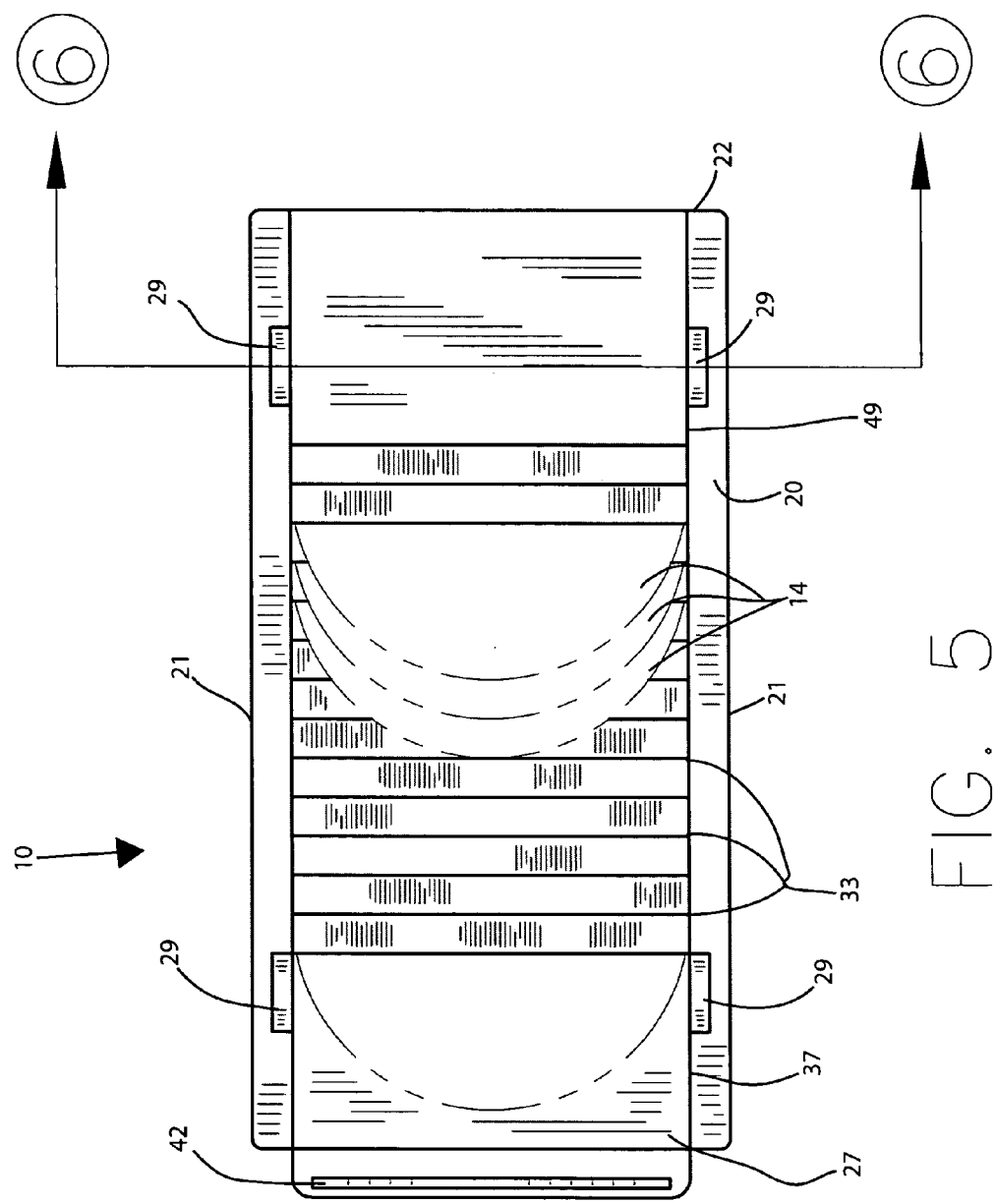
FIG. 5 is a front elevational view of the apparatus shown in FIG. 2 showing CD's held in the slots of the auxiliary storage rack.
Figure 6:
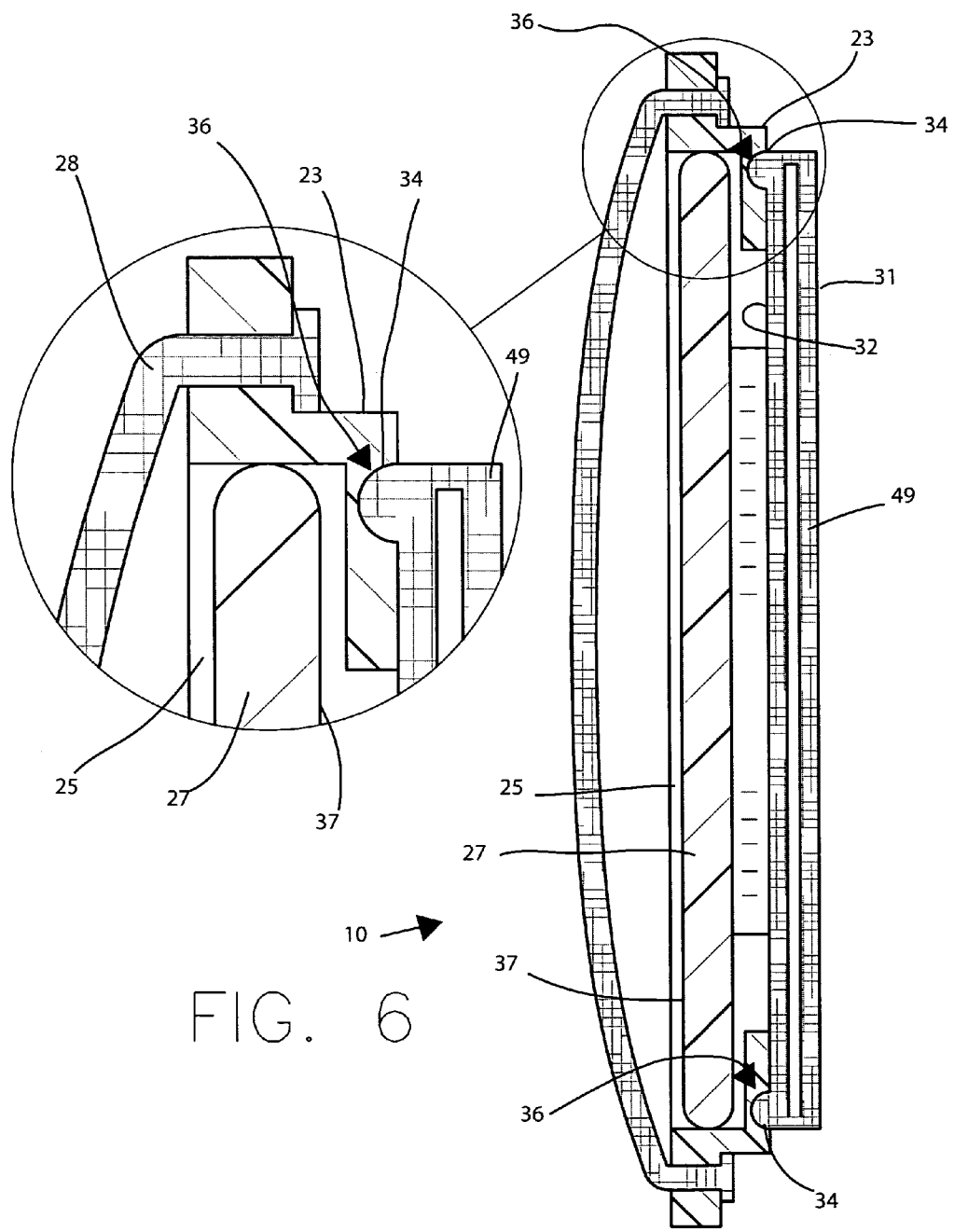
FIG. 6 is a cross sectional view of the apparatus shown in FIG. 5, taken along line 6-6.
Figure 7:
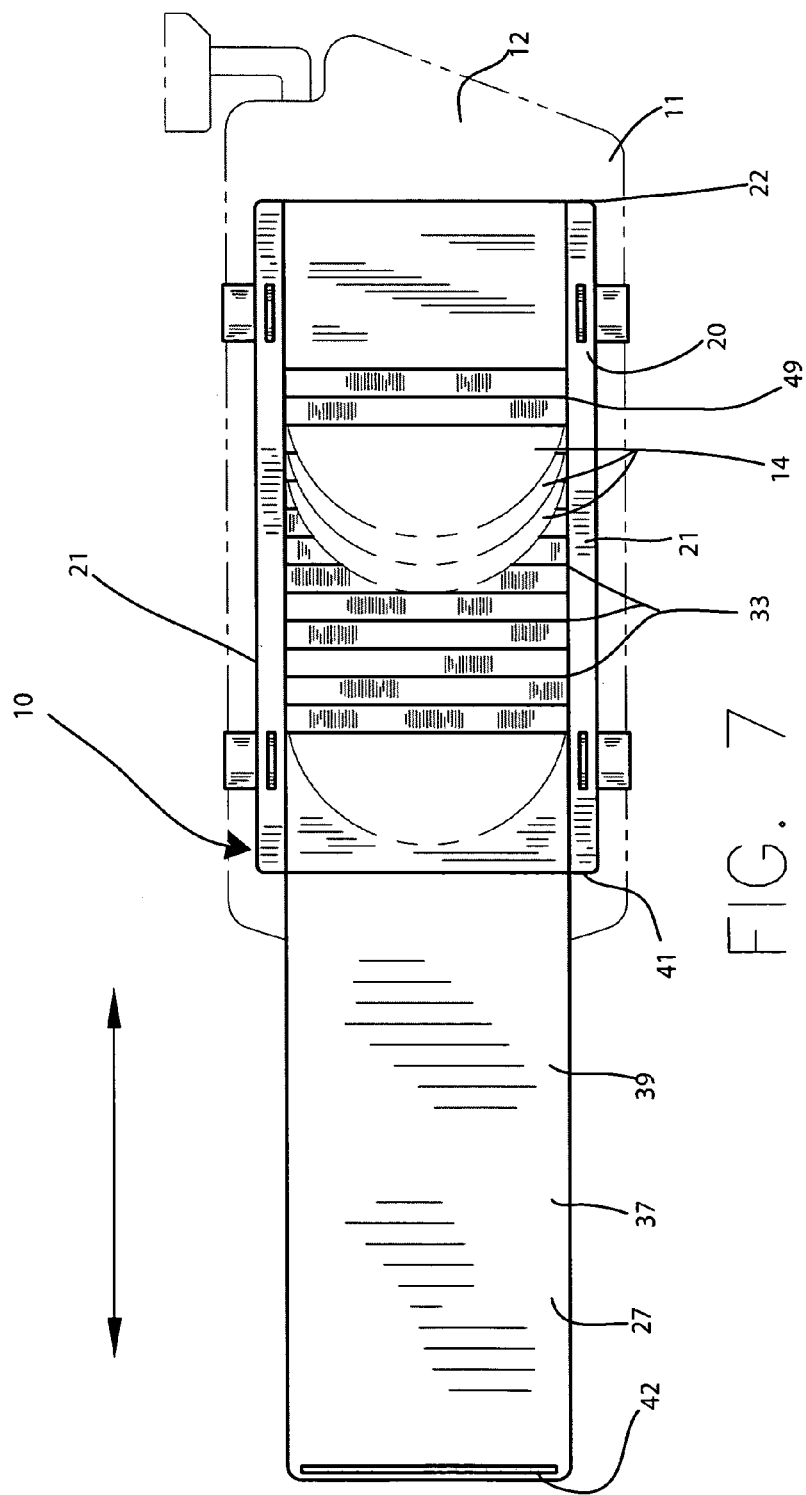
FIG. 7 is a front elevational view of the apparatus shown in FIG. 5 showing the sun-blocking plate in the extended position.

Referring to FIGS. 5, 6 and 7, the apparatus 10 further includes an auxiliary storage rack 49 removably attached to the frame 20. Such a storage rack 49 necessarily includes solid top 31 and bottom 32 surfaces and has a longitudinal length substantially equal to the longitudinal length of the frame 20. The storage rack 49 includes a plurality of slots 33 critically formed along the top surface 31 thereof, which is essential such that a plurality of compact discs 14 are removably positional therein respectively. The storage rack 49 has a plurality of shoulders 34 bulging outwardly from the bottom surface 32 thereof, and the frame 20 includes a plurality of notches 36 effectively formed along the top face 23 of the longitudinal sides 21. Such shoulders 34 are removably snapped into the notches 36 in such a manner that the storage rack 49 remains statically affixed to the frame 20 during operating conditions while the sun-blocking plate 27 is linearly extended back and forth along the longitudinal length of the frame 20. The storage rack 49 is oppositely faced from the straps 28 and effectively extends along an entire surface area of the open top face 23 of the frame 20.

Again referring to FIGS. 1 through 7, the apparatus 10 further includes a sun-blocking plate 27 that has a unitary body 37 telescopically interfitted between the longitudinal sides 21 and the linear ends 22, which is vital such that the sun-blocking plate 27 is slidably displaced along a planar path defined along the frame 20. Such a sun-blocking plate 27 is essentially supported by the straps 28 in such a manner that the sun-blocking plate 27 is advantageously prohibited from offsetting away from the planar path during operating conditions.

The frame 20 is removably attached directly to the existing visor 12, without the use of intervening elements, and lies contiguously therewith. The straps 28 are effectively tensioned about the existing visor 12 and thereby effectively maintain a static spatial relationship between the frame 20 and the existing visor 12, which is critical such that the sun-blocking plate 27 is freely extendable without displacing the frame 20 from a fixed position. Of course, such a sun-blocking plate 27 can be formed from a variety of suitable sun-blocking materials, as is obvious to a person of ordinary skill in the art.

Yet again referring to FIGS. 1 through 7, the sun-blocking plate 27 includes a stop member 38 monolithically formed with a top surface 39 thereof. Such a stop member 38 advantageously protrudes upwardly through the open top face 23 of the frame 20 and is centrally registered between the flanges. The stop member 38 travels linearly along the longitudinal axis and abuts against a proximal end 41 of the frame 20, which is crucial such that the sun-blocking plate 27 is effectively prohibited from detaching away from the frame 20. The sun-blocking plate 27 further includes a lip portion 42 monolithically formed with the top surface 39 thereof. Such a lip portion 42 is axially opposed from the stop member 38 and extends linearly along the proximal end 41 of the frame 20. The lip portion 42 advantageously protrudes upwardly beyond the proximal end 41 of the frame 20, which is essential such that a user can effectively displace the sun-blocking plate 27 while advantageously maintaining a continuous line of sight on a travel course.

The combination of the auxiliary storage rack 49 and the sun-blocking plate 27 provides the unexpected benefit of allowing a user to conveniently store objects in the storage rack slots 33 while also advantageously blocking sunlight from entering the vehicle, thereby overcoming prior art shortcomings of providing only one of a CD holder and a sun visor extender respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined vehicle sun visor extender and CD holder for use with an existing vehicle visor, said combined vehicle sun visor extender and CD holder comprising:
   a one-piece frame having a substantially rectangular shape, said frame having a centrally registered longitudinal axis and further having a pair of longitudinal sides equidistantly spaced from the axis and extending parallel thereto, said frame further having oppositely disposed linear ends monolithically formed with said longitudinal sides and oriented orthogonal thereto respectively, said frame further having open top and bottom faces such that a hollow central region is defined between said longitudinal sides and said linear ends respectively;
   a plurality of elastic straps having longitudinal lengths registered orthogonal to said longitudinal sides and traversing across a width of said frame, said straps being permanently anchored to said frame and spanning subjacent to said open top and bottom faces; and
   a sun-blocking plate having a unitary body telescopically interfitted between said longitudinal sides and said linear ends such that said sun-blocking plate is slidably displaced along a planar path defined along said frame, said sun-blocking plate being supported by said straps in such a manner that said sun-blocking plate is prohibited from offsetting away from the planar path during operating conditions.

2. The combined vehicle sun visor extender and CD holder of claim 1, wherein said frame is removably attached directly to the existing visor and lays contiguously therewith, said straps being tensioned about the existing visor and thereby maintaining a static spatial relationship between said frame and the existing visor such that said sun-blocking plate is freely extendable without displacing said frame from a fixed position.

3. The combined vehicle sun visor extender and CD holder of claim 1, wherein said longitudinal sides are provided with a pair of coextensively shaped flanges monolithically formed therewith, said flanges lying above said sun-blocking plate and extending inwardly towards a center of said open top surface, said flanges terminating equidistantly away from the longitudinal axis and being spaced from said straps.

4. The combined vehicle sun visor extender and CD holder of claim 1, wherein each of said straps is provided with opposed ends directly coupled to corresponding ones of said longitudinal sides, said straps being abutted directly against a first side of the existing visor while said sun-blocking plate travels along a contiguously extending second side of the existing visor.

5. The combined vehicle sun visor extender and CD holder of claim 1, wherein said sun-blocking plate comprises: a stop member monolithically formed with a top surface thereof, said stop member protruding upwardly through said open top surface of said frame and being centrally registered between said flanges, said stop member linearly traveling along the longitudinal axis and abutting against a proximal end of said frame such that said sun-blocking plate is prohibited from detaching away from said frame.

6. The combined vehicle sun visor extender and CD holder of claim 1, wherein said sun-blocking plate further comprises: a lip portion monolithically formed with said top surface thereof, said lip portion being axially opposed from said stop member and linearly extending along said proximal end of said frame, said lip portion protruding upwardly beyond said proximal end of said frame such that a user can effectively displace said sun-blocking plate while maintaining a continuous line of sight on a travel course.

7. A combined vehicle sun visor extender and CD holder for use with an existing vehicle visor, said combined vehicle sun visor extender and CD holder comprising:
   a unitary frame having a substantially rectangular shape, said frame having a centrally registered longitudinal axis and further having a pair of longitudinal sides equidistantly spaced from the axis and extending parallel thereto, said frame further having oppositely disposed linear ends monolithically formed with said longitudinal sides and oriented orthogonal thereto respectively, said frame further having open top and bottom faces such that a hollow central region is defined between said longitudinal sides and said linear ends respectively;
   a plurality of elastic straps having longitudinal lengths registered orthogonal to said longitudinal sides and traversing across a width of said frame, said straps being permanently anchored to said frame and spanning subjacent to said open top and bottom faces;
   an auxiliary storage rack removably attached to said frame, said storage rack including solid top and bottom surface and having a longitudinal length substantially equal to the longitudinal length of said frame, said storage rack including a plurality of slots formed along a top surface thereof wherein a plurality of compact discs are removably positional therein respectively, said storage rack having a plurality of shoulders bulging outwardly form a bottom surface thereof, said frame including a plurality of notches formed along a top surface of said longitudinal sides, wherein said bulges are removably snapped into said notches in such a manner that said storage rack remains statically affixed to said frame during operating conditions while said sun-blocking visor extender is linearly extended back and forth along the longitudinal length of said frame; and
   a sun-blocking plate having a unitary body telescopically interfitted between said longitudinal sides and said linear ends such that said sun-blocking plate is slidably displaced along a planar path defined along said frame, said sun-blocking plate being supported by said straps in such a manner that said sun-blocking plate is prohibited from offsetting away from the planar path during operating conditions.

8. The combined vehicle sun visor extender and CD holder of claim 7, wherein said frame is removably attached directly to the existing visor and lays contiguously therewith, said straps being tensioned about the existing visor and thereby maintaining a static spatial relationship between said frame and the existing visor such that said sun-blocking plate is freely extendable without displacing said frame from a fixed position.

9. The combined vehicle sun visor extender and CD holder of claim 7, wherein said longitudinal sides are provided with a pair of coextensively shaped flanges monolithically formed therewith, said flanges lying above said sun-blocking plate and extending inwardly towards a center of said open top surface, said flanges terminating equidistantly away from the longitudinal axis and being spaced from said straps.

10. The combined vehicle sun visor extender and CD holder of claim 7, wherein each of said straps is provided with opposed ends directly coupled to corresponding ones of said longitudinal sides, said straps being abutted directly against a first side of the existing visor while said sun-blocking plate travels along a contiguously extending second side of the existing visor.

11. The combined vehicle sun visor extender and CD holder of claim 7, wherein said sun-blocking plate comprises: a stop member monolithically formed with a top surface thereof, said stop member protruding upwardly through said open top surface of said frame and being centrally registered between said flanges, said stop member linearly traveling along the longitudinal axis and abutting against a proximal end of said frame such that said sun-blocking plate is prohibited from detaching away from said frame.

12. The combined vehicle sun visor extender and CD holder of claim 7, wherein said sun-blocking plate further comprises: a lip portion monolithically formed with said top surface thereof, said lip portion being axially opposed from said stop member and linearly extending along said proximal end of said frame, said lip portion protruding upwardly beyond said proximal end of said frame such that a user can effectively displace said sun-blocking plate while maintaining a continuous line of sight on a travel course.

13. A combined vehicle sun visor extender and CD holder for use with an existing vehicle visor, said combined vehicle sun visor extender and CD holder comprising:
   a unitary frame having a substantially rectangular shape, said frame having a centrally registered longitudinal axis and further having a pair of longitudinal sides equidistantly spaced from the axis and extending parallel thereto, said frame further having oppositely disposed linear ends monolithically formed with said longitudinal sides and oriented orthogonal thereto respectively, said frame further having open top and bottom faces such that a hollow central region is defined between said longitudinal sides and said linear ends respectively;
   a plurality of elastic straps having longitudinal lengths registered orthogonal to said longitudinal sides and traversing across a width of said frame, said straps being permanently anchored to said frame and spanning subjacent to said open top and bottom faces;
   an auxiliary storage rack removably attached to said frame, said storage rack including solid top and bottom surface and having a longitudinal length substantially equal to the longitudinal length of said frame, said storage rack including a plurality of slots formed along a top surface thereof wherein a plurality of compact discs are removably positional therein respectively, said storage rack having a plurality of shoulders bulging outwardly form a bottom surface thereof, said frame including a plurality of notches formed along a top surface of said longitudinal sides, wherein said bulges are removably snapped into said notches in such a manner that said storage rack remains statically affixed to said frame during operating conditions while said sun-blocking visor extender is linearly extended back and forth along the longitudinal length of said frame, wherein said storage rack is oppositely faced from said straps and extends along an entire surface area of said open top surface of said frame; and a sun-blocking plate having a unitary body telescopically interfitted between said longitudinal sides and said linear ends such that said sun-blocking plate is slidably displaced along a planar path defined along said frame, said sun-blocking plate being supported by said straps in such a manner that said sun-blocking plate is prohibited from offsetting away from the planar path during operating conditions.

14. The combined vehicle sun visor extender and CD holder of claim 13, wherein said frame is removably attached directly to the existing visor and lays contiguously therewith, said straps being tensioned about the existing visor and thereby maintaining a static spatial relationship between said frame and the existing visor such that said sun-blocking plate is freely extendable without displacing said frame from a fixed position.

15. The combined vehicle sun visor extender and CD holder of claim 13, wherein said longitudinal sides are provided with a pair of coextensively shaped flanges monolithically formed therewith, said flanges lying above said sun-blocking plate and extending inwardly towards a center of said open top surface, said flanges terminating equidistantly away from the longitudinal axis and being spaced from said straps.

16. The combined vehicle sun visor extender and CD holder of claim 13, wherein each of said straps is provided with opposed ends directly coupled to corresponding ones of said longitudinal sides, said straps being abutted directly against a first side of the existing visor while said sun-blocking plate travels along a contiguously extending second side of the existing visor.

17. The combined vehicle sun visor extender and CD holder of claim 13, wherein said sun-blocking plate comprises: a stop member monolithically formed with a top surface thereof, said stop member protruding upwardly through said open top surface of said frame and being centrally registered between said flanges, said stop member linearly traveling along the longitudinal axis and abutting against a proximal end of said frame such that said sun-blocking plate is prohibited from detaching away from said frame.

18. The combined vehicle sun visor extender and CD holder of claim 13, wherein said sun-blocking plate further comprises: a lip portion monolithically formed with said top surface thereof, said lip portion being axially opposed from said stop member and linearly extending along said proximal end of said frame, said lip portion protruding upwardly beyond said proximal end of said frame such that a user can effectively displace said sun-blocking plate while maintaining a continuous line of sight on a travel course.

* * * * *